United States Patent
Byon et al.

(10) Patent No.: US 11,609,411 B2
(45) Date of Patent: Mar. 21, 2023

(54) FOLDED CAMERA AND ELECTRONIC DEVICE INCLUDING THE SAME

(71) Applicant: Samsung Electronics Co., Ltd., Gyeonggi-do (KR)

(72) Inventors: Kwangseok Byon, Gyeonggi-do (KR); Byungkwon Kang, Gyeonggi-do (KR); Hyunho Yu, Gyeonggi-do (KR)

(73) Assignee: Samsung Electronics Co., Ltd

( * ) Notice: Subject to any disclaimer, the term of this patent is extended or adjusted under 35 U.S.C. 154(b) by 376 days.

(21) Appl. No.: 16/815,831

(22) Filed: Mar. 11, 2020

(65) Prior Publication Data
US 2020/0319439 A1    Oct. 8, 2020

(30) Foreign Application Priority Data

Apr. 8, 2019    (KR) .................. 10-2019-0041010

(51) Int. Cl.

| | |
|---|---|
| G03B 17/02 | (2021.01) |
| H04N 5/225 | (2006.01) |
| G03B 5/00 | (2021.01) |
| G02B 7/09 | (2021.01) |
| G02B 17/02 | (2006.01) |
| G02B 26/08 | (2006.01) |
| G03B 13/36 | (2021.01) |
| G03B 17/17 | (2021.01) |

(52) U.S. Cl.
CPC .............. *G02B 17/023* (2013.01); *G02B 7/09* (2013.01); *G02B 26/0816* (2013.01); *G03B 5/00* (2013.01); *G03B 13/36* (2013.01); *G03B 17/17* (2013.01); *H04N 5/225* (2013.01); *H04N 5/2254* (2013.01)

(58) Field of Classification Search
CPC .... G02B 17/023; G02B 26/0816; G03B 5/00; G03B 13/36; G03B 2205/0015; G03B 2205/0069; G03B 3/10; G03B 5/02; G03B 17/12; G03B 30/00; G03B 17/17; G03B 2205/0007; H04N 5/2254; H04N 5/2257
See application file for complete search history.

(56) References Cited

U.S. PATENT DOCUMENTS

| | | |
|---|---|---|
| 9,285,566 B2 | 3/2016 | Chan et al. |
| 9,632,327 B2 | 4/2017 | Chan et al. |
| 9,927,600 B2 | 3/2018 | Goldenberg et al. |

(Continued)

OTHER PUBLICATIONS

International Search Report dated Jun. 12, 2020 issued in counterpart application No. PCT/KR2020/002357, 9 pages.

(Continued)

*Primary Examiner* — Abdelaaziz Tissire
(74) *Attorney, Agent, or Firm* — The Farrell Law Firm, P.C.

(57) ABSTRACT

An electronic device includes a lens assembly that receives external light, which is used by a camera module to capture a still image and/or a moving picture, in a first direction, a housing forming an outer portion of the camera module, a first support disposed inside the housing and disposed in a second direction away from the lens assembly, wherein the second direction is perpendicular to the first direction; and a second support including at least a portion protruding in the second direction while surrounding the lens assembly, wherein the first support and the second support are disposed in the second direction away from the lens assembly.

20 Claims, 11 Drawing Sheets

(56) References Cited

U.S. PATENT DOCUMENTS

| | | | |
|---|---|---|---|
| 10,070,060 B2 | 9/2018 | Goldenberg et al. | |
| 10,162,191 B2 | 12/2018 | Chan et al. | |
| 10,371,928 B2 | 8/2019 | Goldenberg et al. | |
| 10,372,022 B2 | 8/2019 | Avivi et al. | |
| 10,459,205 B2 | 10/2019 | Goldenberg et al. | |
| 10,489,205 B2 | 11/2019 | Munshi | |
| 10,498,961 B2 | 12/2019 | Goldenberg et al. | |
| 11,258,931 B2* | 2/2022 | Kang | H04N 5/2254 |
| 2014/0218798 A1 | 8/2014 | Suzuka | |
| 2017/0329111 A1* | 11/2017 | Hu | H04N 5/23296 |
| 2018/0017844 A1* | 1/2018 | Yu | G02B 7/08 |
| 2018/0024329 A1* | 1/2018 | Goldenberg | H04N 5/2258 |
| | | | 359/557 |
| 2018/0120674 A1 | 5/2018 | Avivi et al. | |
| 2018/0224665 A1 | 8/2018 | Im et al. | |
| 2018/0231793 A1 | 8/2018 | Jeong et al. | |
| 2018/0343391 A1 | 11/2018 | Goldenberg et al. | |
| 2019/0004328 A1 | 1/2019 | Lee et al. | |
| 2019/0098182 A1 | 3/2019 | Byon et al. | |
| 2019/0101808 A1 | 4/2019 | Byon et al. | |
| 2019/0361260 A1 | 11/2019 | Jeong et al. | |
| 2019/0361261 A1 | 11/2019 | Lee et al. | |
| 2019/0377155 A1* | 12/2019 | Bachar | G02B 7/09 |
| 2020/0081321 A1* | 3/2020 | Tseng | G02B 13/0065 |
| 2020/0310149 A1* | 10/2020 | Kazuo | G03B 5/00 |

OTHER PUBLICATIONS

European Search Report dated Mar. 25, 2022 issued in counterpart application No. 20788627.6-1010, 12 pages.

* cited by examiner

FOLDED CAMERA AND ELECTRONIC DEVICE INCLUDING THE SAME

CROSS-REFERENCE TO RELATED APPLICATION(S)

This application is based on and claims priority under 35 U.S.C. § 119 to Korean Patent Application No. 10-2019-0041010, filed on Apr. 8, 2019, in the Korean Intellectual Property Office, the entire disclosure of which is incorporated herein by reference.

BACKGROUND

1. Field

The disclosure relates generally to a technology for implementing a folded camera and an electronic device including the same.

2. Description of Related Art

An electronic device, such as a smart phone, may include a camera for photographing. The performance of the camera may depend on the maximum enlargement magnification allowed in a zoom-in function to enlarge a specific area.

In an optical system that collects and refracts incident light onto a camera to create an optical image of an external object, the focal length may be increased in proportion to magnification in order to implement a camera having a higher-magnification zoom-in function.

In a conventional camera, an optical axis of a lens may be formed in a direction of thickness of an electronic device (which is the direction of a field of view (FoV) for photographing). In the conventional camera, it is difficult to make the focal length to be greater than the thickness of an inner space of the electronic device, and it is difficult to embed a high-magnification camera in the electronic device. Additionally, when the focal length of the conventional camera is increased, the thickness of the electronic device may increase.

The camera may include an auto focus (AF) driver to perform AF to automatically adjust the focus of the object by automatically adjusting the focal length and an optical image stabilization (OIS) driver to reduce the influence exerted by a shaky hand.

A conventional folded camera has been developed such that the optical axis of a lens is changed to a right angle with respect to the FoV. The folded camera may change the optical axis to a right angle by reflecting incident light using a mirror and allowing the light to be incident to a lens disposed inside the folded camera. The folded camera may be easily mounted inside the electronic device as the optical axis is formed in parallel to a front surface or a rear surface of the electronic device.

In the folded camera, when the AF driver and the OS driver are disposed symmetrically to each other, the edge of the AF driver and/or the edge of the OIS driver may protrude in the direction of the thickness of the electronic device, when compared to the optical system of the folded camera. Accordingly, as the thickness of the folded camera increases, the thickness of the electronic device may also increase. However, by decreasing the size of the optical system to reduce the thickness of the optical system and the folded camera, the performance of the folded camera may decrease.

SUMMARY

The disclosure has been made to address the above-mentioned problems and disadvantages, and to provide at least the advantages described below.

In accordance with an aspect of the disclosure, an electronic device includes a lens assembly to allow external light, which is used by a camera module to capture a still image and a moving picture, to travel in a first direction, a housing forming an outer portion of the camera module, a first support disposed inside the housing and disposed in a second direction away from the lens assembly, wherein the second direction is perpendicular to the first direction; and a second support including at least a portion protruding in the second direction while surrounding the lens assembly, wherein the first support and the second support are disposed in the second direction away from the lens assembly.

In accordance with another aspect of the disclosure, an electronic device includes a lens assembly to allow external light, which is used by a camera module to capture a still image and a moving picture, to travel in a first direction, a housing forming an outer portion of the camera module, a first support disposed inside the housing while extending in a second direction, which is perpendicular to the first direction, away from the lens assembly, and a second support having at least a portion protruding in the second direction while surrounding the lens assembly. The first support includes a magnet member, the housing includes a first metal member, and the second support includes a second metal member.

In accordance with another aspect of the disclosure, an electronic device includes a lens assembly to allow external light, which is used by a camera module to capture a still image and a moving picture, to travel in a first direction, a housing forming an outer portion of the camera module, a first support disposed inside the housing while extending in a second direction, which is perpendicular to the first direction, away from the lens assembly, a second support having at least a portion protruding in the second direction while surrounding the lens assembly, a third support to support a mirror allowing the light to be incident onto the lens assembly in the first direction, and a rotation driver to drive the third support such that the third support rotates along a first radius. The rotation driver includes a sensor to measure an angle of the third support, and the sensor is spaced apart from a rotation shaft of the rotation driver by a length longer than the first radius.

In accordance with another aspect of the disclosure, an electronic device includes an external housing including a first external surface facing in a first direction and a second external surface facing in a second direction opposite to the first direction, a camera housing provided inside the external housing, disposed adjacent to the first external surface. The camera housing includes a first surface facing in the first direction and including an opening, a second surface facing in the second direction, a third surface facing in a third direction perpendicular to the first direction, a fourth surface facing in a fourth direction opposite to the third direction, and a fifth surface facing in a fifth direction perpendicular to the first direction, the third direction, and the fourth direction, wherein the fifth surface makes contact with the third surface. The electronic device includes an image sensor disposed inside the camera housing, a lens unit including a plurality of lenses disposed inside the camera housing, aligned about a shaft extending in the fifth direction, and including faces substantially facing in the fifth direction, a first structure disposed inside the camera housing, surrounding at least a portion of the lens unit, and including a protrusion extending in the fourth direction, and a second structure interposed between the protrusion and the second surface, inside the camera housing and including a sixth surface facing in the first direction and a seventh surface facing in the second direction. A first distance from the shaft to the fourth surface is longer than a second distance from the shaft to the third surface.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
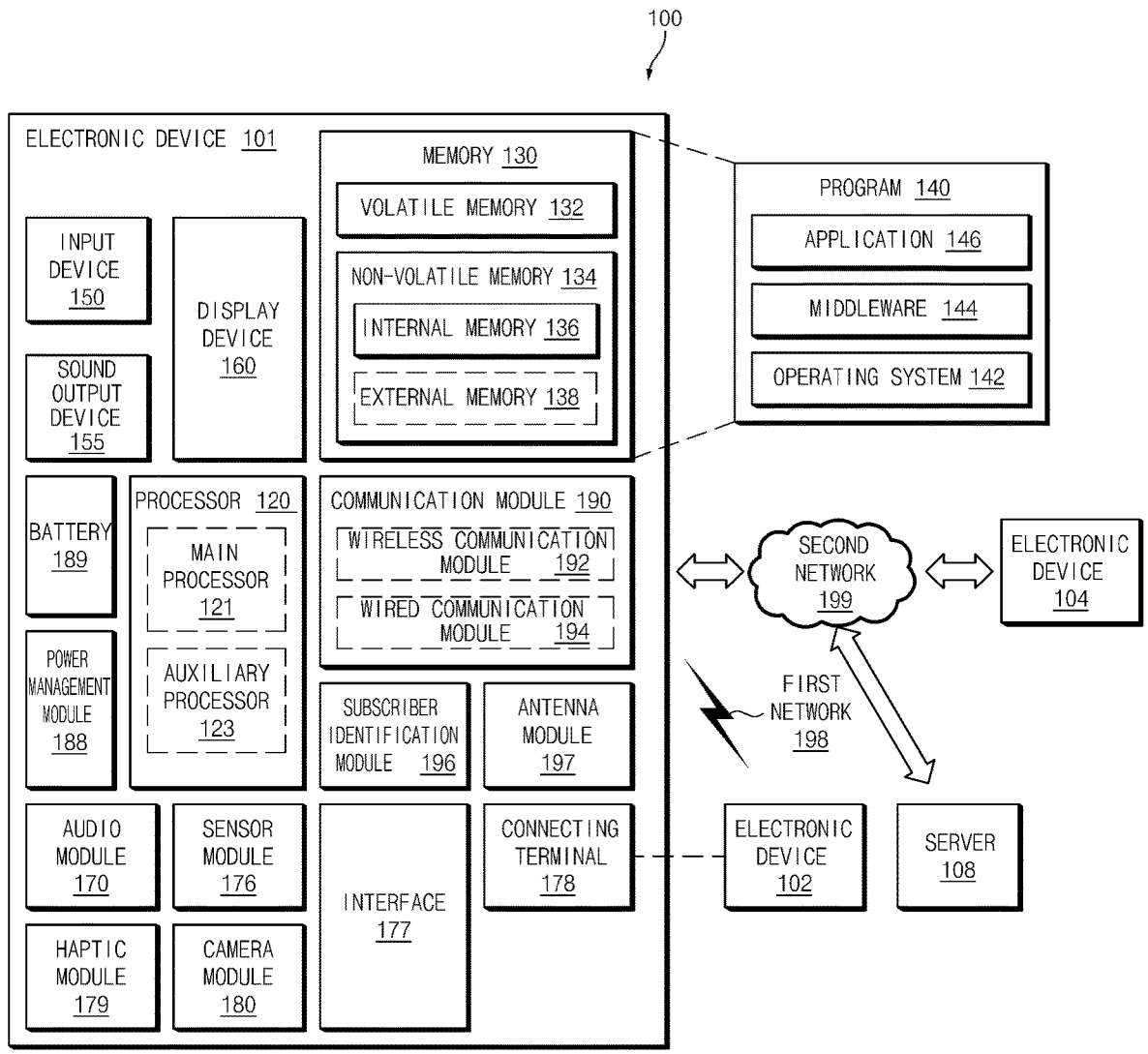
FIG. 1 is a block diagram illustrating an electronic device in a network environment according to various embodiments.

Various embodiments of the disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

Accordingly, an aspect of the disclosure is to provide an electronic device and/or folded camera capable of preventing an AF driver and/or OIS driver of a camera module of the electronic device from protruding and increasing a thickness of the electronic device.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
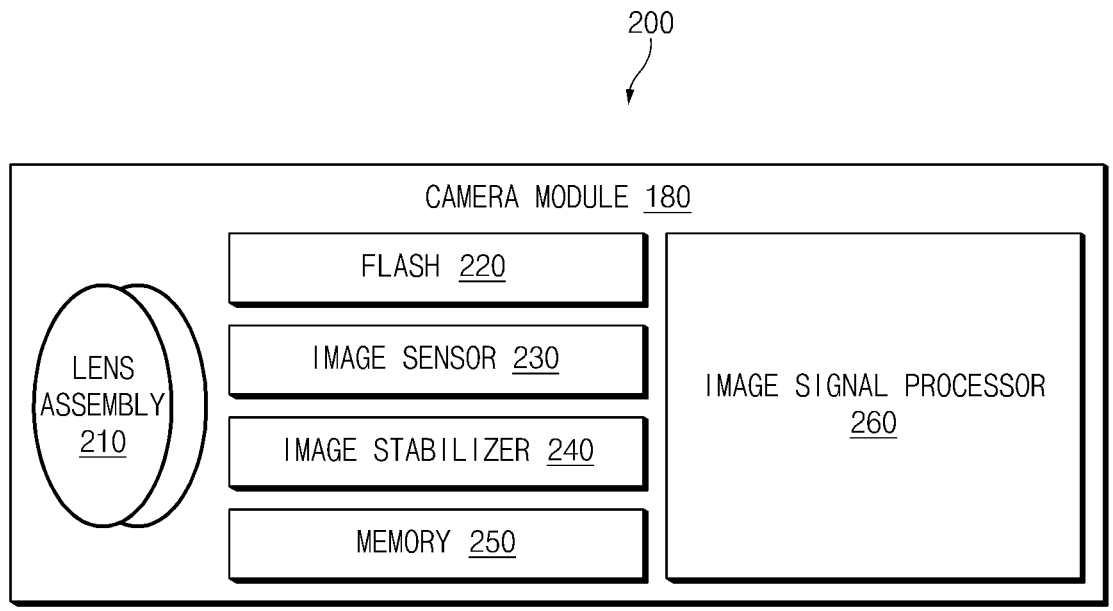
FIG. 2 is a block diagram illustrating the camera module according to various embodiments.

FIG. 2 is a block diagram 200 illustrating the camera module 180 according to various embodiments.

Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as an RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated to independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
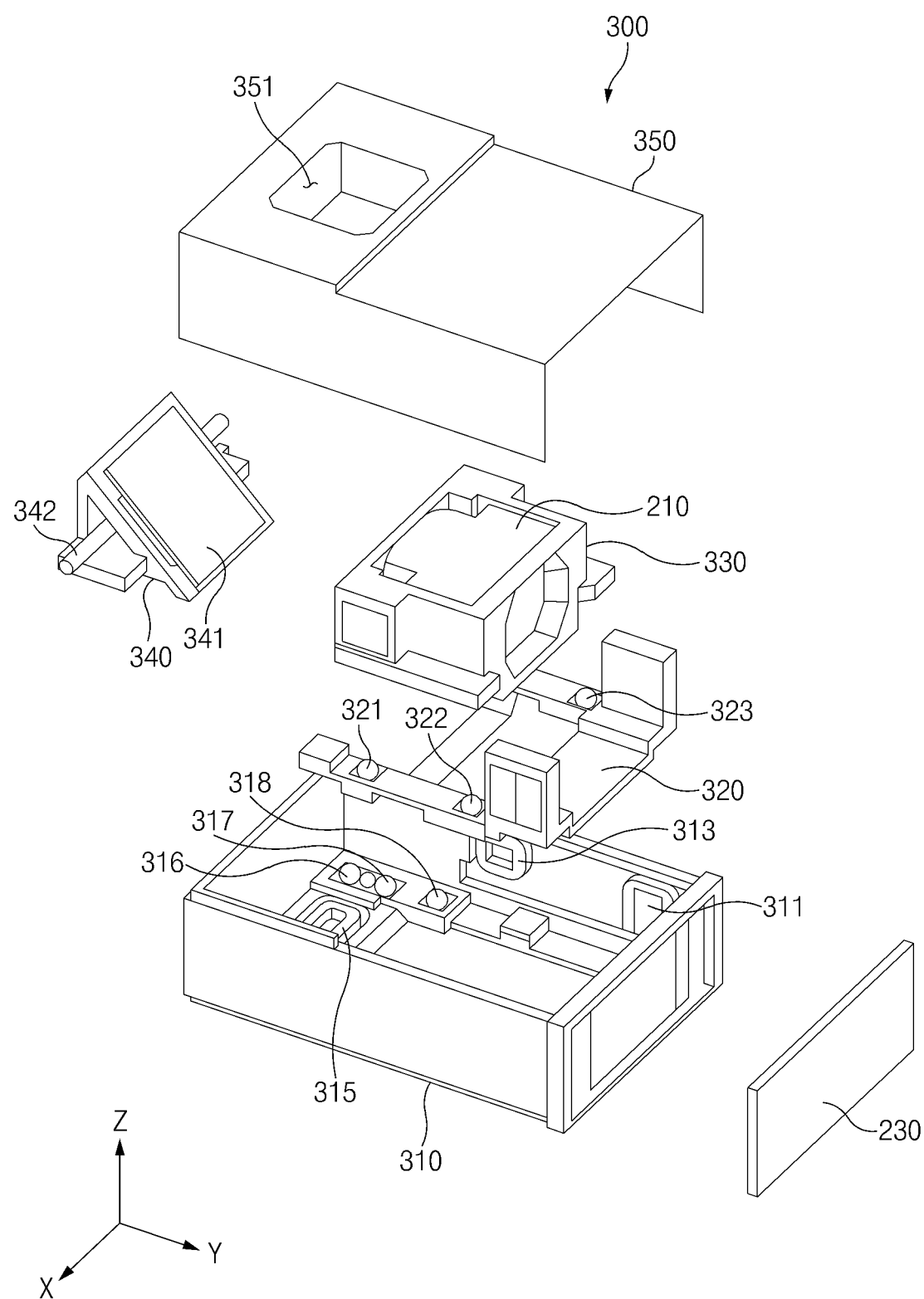
FIG. 3 illustrates an exploded view of a camera module, according to an embodiment.

FIG. 3 illustrates an exploded view 300 of a camera module 180, according to an embodiment.

Referring to FIG. 3, the camera module 300 includes a housing 310, a first support 320, a second support 330, a third support 340, and/or a cover 350.

The housing 310 may include a plane part formed in a first direction (an X-axis direction) and a second direction (a Y-axis direction) perpendicular to the first direction and a side surface part extending in a third direction (a Z-axis direction) which is a direction perpendicular to the plane part. The housing 310 may form an outer portion of the camera module 300 through the plane part and the side surface part. The housing 310 may include a first driver 311, a second driver 313, a third driver 315, a first rotation part 316, a second rotation part 317, and/or a third rotation part 318.

The first driver 311 may move the first support 320 in a second direction (Y-axis direction). The second driver 313 may move the second support 330 in the first direction (X-axis direction). The third driver 315 may rotate a rotation shaft 342 of the third support 340. The first rotation part 316, second rotation part 317, and/or third rotation part 318 may allow the first support 320 to easily move in the second direction For example, the first rotation part 316, second rotation part 317, and/or third rotation part 318 may be balls or bearings.

The first support 320 may be disposed adjacent to the plane part of the housing 310. The first support 320 may support the second support 330. The first support 320 may include fourth rotation part 321, fifth rotation part 322, and sixth rotation part 323.

The fourth rotation part 321, fifth rotation part 322, and sixth rotation part 323 may allow the second support 330 to easily move in the first direction (X-axis direction). For example, the fourth rotation part 321, fifth rotation part 322, and sixth rotation part 323 may be balls or bearings.

The second support 330 may be disposed adjacent to the first support 320 in the third direction (Z-axis direction). The second support 330 may support the lens assembly 210.

The third support 340 may be disposed adjacent to the second support 330 in the second direction (Y-axis direction). The third support 340 may support a mirror 341. The third support 340 may include the mirror 341 and the rotation shaft 342.

The mirror 341 may reflect external light such that the external light is incident onto the lens assembly 210. The rotation shaft 342 may control an angle between the mirror 341 and an opening 351 to control a path of light to be incident onto the lens assembly 210.

The cover 350 may have a structure that forms a space in the housing 310. The cover 350 may cover at least one surface of the camera module 180. The cover 350 may include the opening 351 formed in the third direction (Z-axis direction).

External light incident onto the opening 351 may be reflected by the mirror 341 and incident onto the lens assembly 210. The light passing through the lens assembly 210 may be in a focused state at the position in which the light is incident to an image sensor 230.

Figure 4:
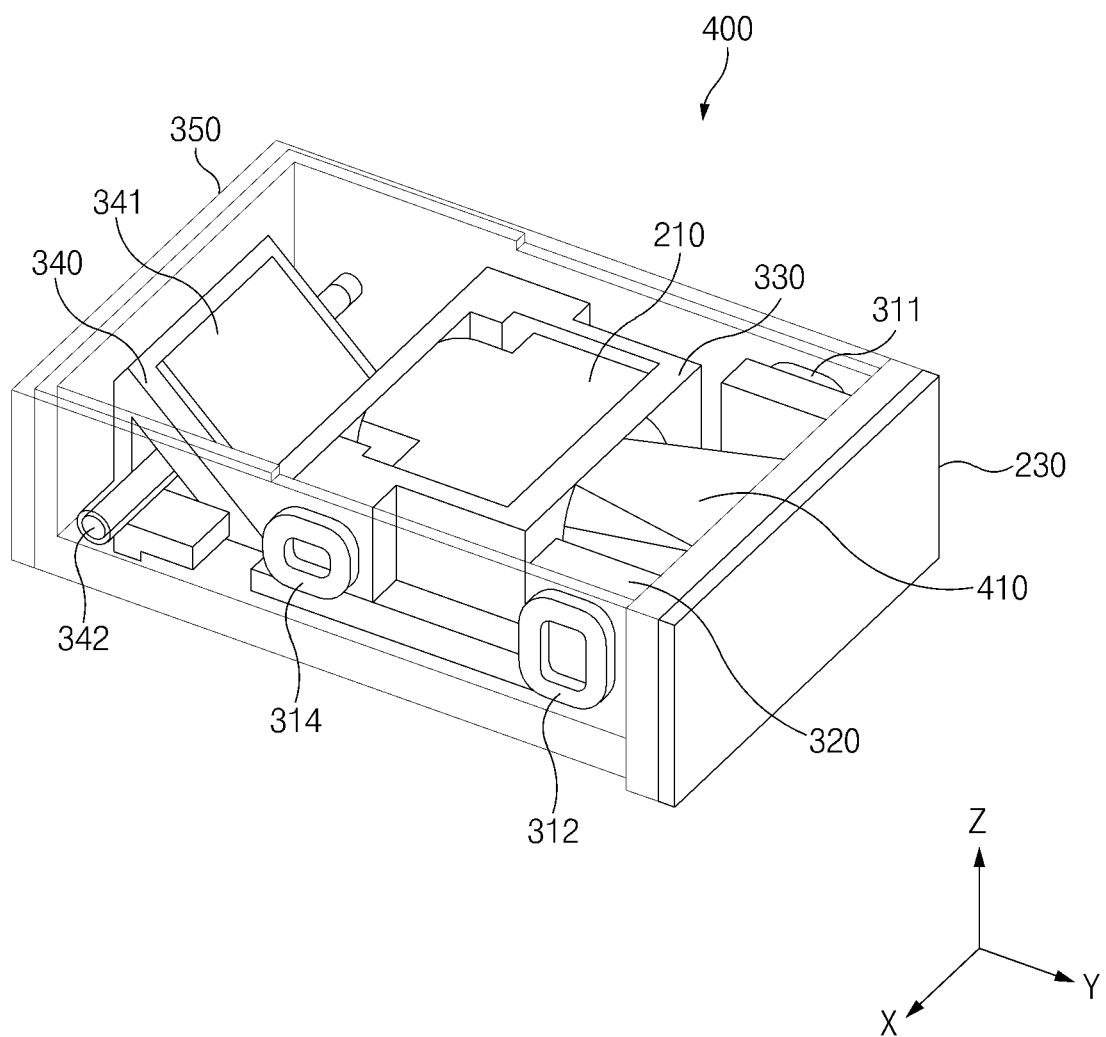
FIG. 4 illustrates a perspective view of a camera module, according to an embodiment.

FIG. 4 illustrates a perspective view 400 of a camera module 180, according to an embodiment. Specifically, FIG. 4 illustrates the first drivers 311 and 312 and the second driver 314, which are hidden by the housing 310 so as not to be viewed.

Referring to FIG. 4, the first drivers 311 and 312 may move the second support 330 in the second direction (Y-axis direction) by moving the first support 320 in the second direction. The first drivers 311 and 312 may move the lens assembly 210 in the second direction by moving the second support 330. The first drivers 311 and 312 may move the lens assembly 210 in the second direction to adjust the focal length while moving the lens assembly 210 in parallel to the light incident onto the lens assembly 210. The first drivers 311 and 312 may implement an AF function to adjust the focal length of the lens assembly 210.

The second driver 314 may move the lens assembly 210 in the first direction (X-axis direction) by moving the second support 330 in the first direction. The second driver 314 may correct an angle of light, which is incident onto the lens assembly 210, in the first direction to correspond to the movement degree of the camera module 180 in the first direction. The second driver 314 may implement an OIS function in the first direction.

The rotation shaft 342 of the third support 340 may change the angle of light traveling in the second direction (Y-axis direct) such that the light is incident onto the lens assembly 210 by rotating the mirror 341 about the rotation shaft 342 of the third support 340. The rotation shaft 342 may correct an angle of light, which is incident onto the lens assembly 210, in the second direction to correspond to the movement degree of the camera module 180 in the second direction. The rotation shaft 342 may implement the OIS function in the second direction.

A guide member 410 may be additionally interposed between the lens assembly 210 and the image sensor 230 to prevent light from leaking. The guide member 410 may be disposed to pass between the first drivers 311 and 312 of the housing 310.

Figure 5:
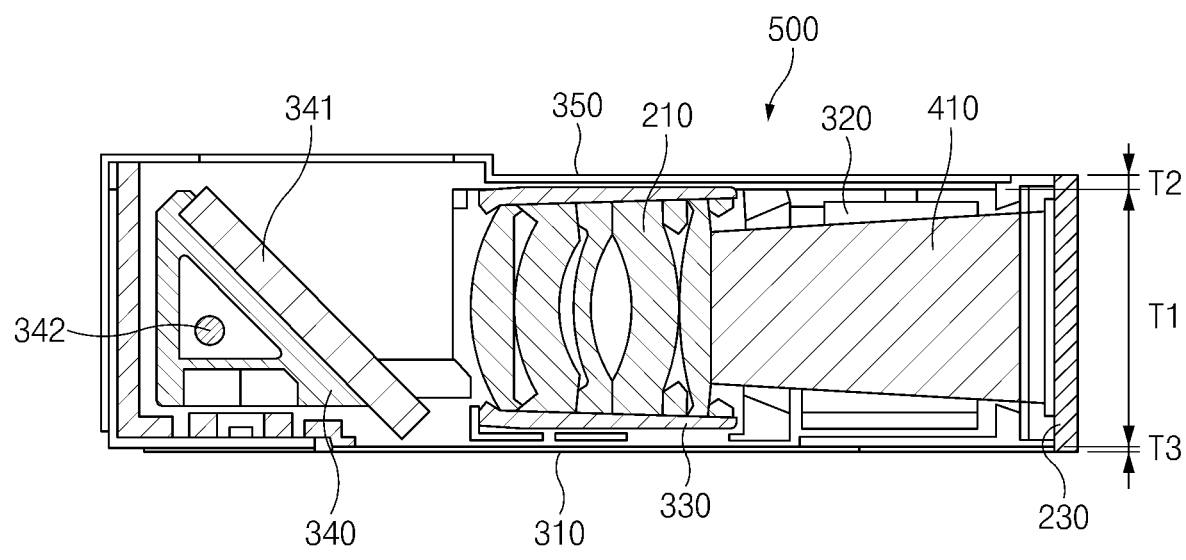
FIG. 5 illustrates a sectional view of a camera module, according to an embodiment.
Figure 5:
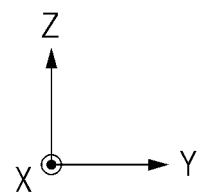

FIG. 5 illustrates an exploded view 500 of a camera module 180, according to an embodiment.

Referring to FIG. 5, the lens assembly 210 may have the first thickness T1 in the third direction (Z-axis direction) necessary to satisfy the focal length or the maximum magnification of the optical system.

The first support 320, the second support 330, and/or the third support 340 may be disposed in the housing 310 to implement the AF function and/or the OIS function for the camera module 180. In addition, the cover 350 may be disposed to protect the camera module 180. The first support 320, the second support 330, the third support 340, and the cover 350 may have a symmetrical structure in the first direction (X-axis direction) about the center.

If the first support 320, the second support 330, the third support 340, and the cover 350 are symmetrical to each other in the first direction (X-axis direction) from the center, the camera module 180 may become thicker than the lens assembly 210. For example, a portion of the cover 350 may protrude by the second thickness T2 toward any one side in the third direction (Z-axis direction) due to the positioning of the second support 330. In addition, another part of the cover 350 may protrude by the third thickness T3 toward an opposite side in the third direction due to the positioning of the first support 320. Accordingly, the thickness of the camera module 180 may become the sum of the first thickness T1, the second thickness T2, and the third thickness T3, thereby increasing the thickness of the electronic device 101. When the thickness of the camera module 180 is reduced by the first thickness T1, which is the thickness of the optical system, the optical system may not function properly because, when the first thickness T1 is reduced, the higher-magnification camera module 180 may not be mounted inside the electronic device 101.

When the first support 320, the second support 330, and the third support 340 are prevented from protruding in the third direction (Z-axis direction), the cover 350 is prevented from protruding in the third direction. Accordingly, the thickness of the camera module 180 may be formed to be approximately equal to the thickness T1, which is the thickness of the optical system. The symmetric structure of the first support 320 and the second support 330 may be changed to prevent the first support 320, the second support 330, and the third support 340 from protruding in the third direction.

Figure 6:
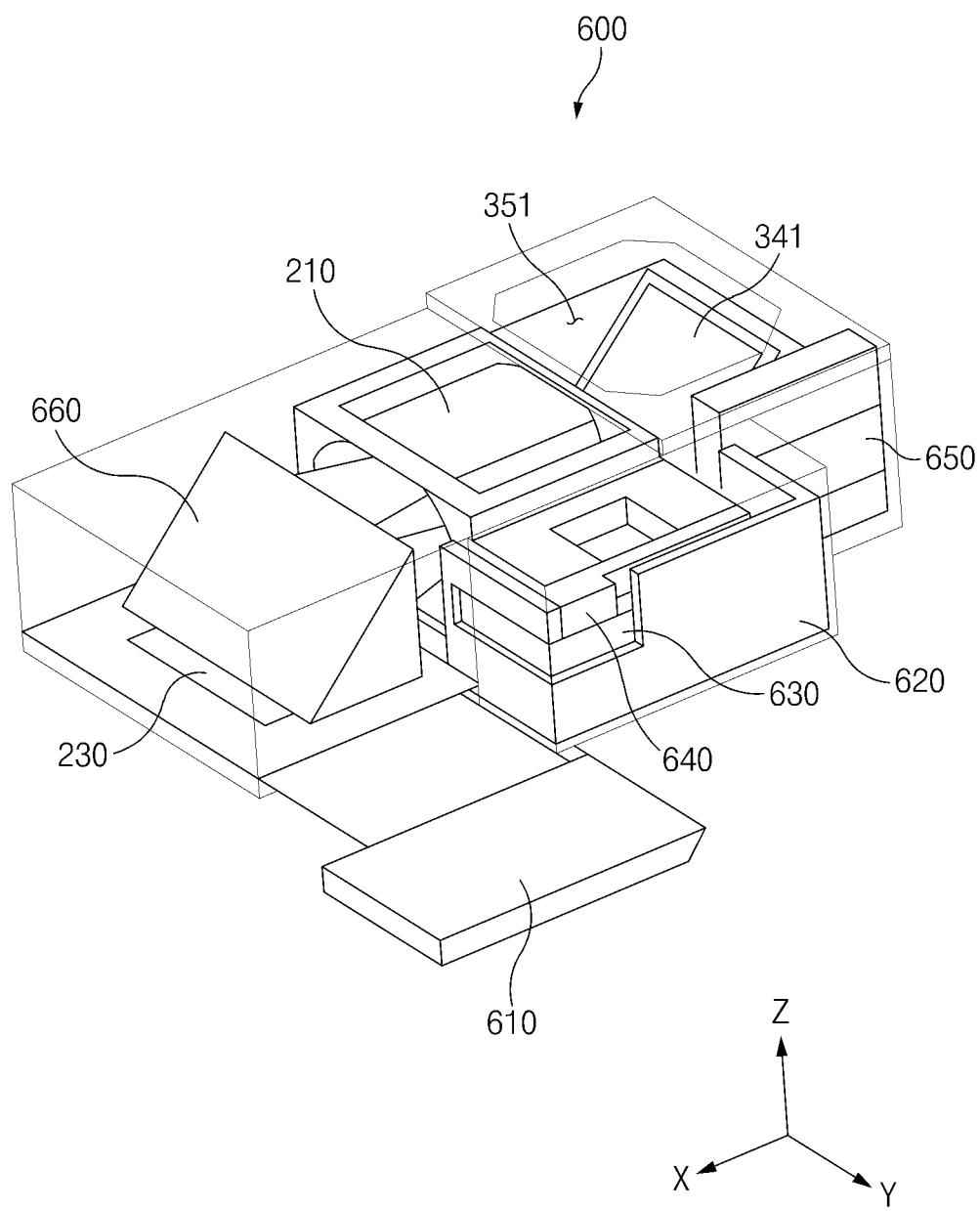
FIG. 6 illustrates a perspective view of a camera module, according to an embodiment.

FIG. 6 illustrates an exploded view 600 of a camera module 180, according to an embodiment. The camera module 180 includes the lens assembly 210, an image sensor 230, a mirror 341, a first housing 610, a second housing 620, a first support 630, a second support 640, a third support and/or a prism 660.

The lens assembly 210 may receive external light in the first direction (X-axis direction). The external light may pass through an opening 351 of the second housing 620 to be incident into the third direction (Z-axis direction). The traveling path of light incident to the opening 351 may be changed by the mirror 341 to be in the first direction. The lens assembly 210 may transmit the external light to the image sensor 230.

The image sensor 230 may be disposed on a plane (XY plane) parallel to the first direction (X-axis direction) and the second direction (Y-axis direction). The image sensor 230 may process light incident in the third direction (Z-axis direction). The traveling path of external light to be output in the first direction (X-axis direction) from the lens assembly 210 may be changed by the prism 660 to be output in the third direction (Z-axis direction). The image sensor 230 may receive and process the light output from the lens assembly 210.

The first housing 610 may form at least a portion of one surface of the camera module 180. For example, the first housing 610 may form at least a portion of a plane (XY plane) parallel to the first direction (X-axis direction) and the second direction (Y-axis direction) in the camera module 180. At least a portion of the first housing 610 may protrude in the second direction. The first housing 610 may have the image sensor 230 included in the camera module 180. The first housing 610 may support the prism 660.

The second housing 620 may be disposed at an outer portion of the camera module 180 other than a portion in which the first housing 610 is disposed. The second housing 620 may include the lens assembly 210, the mirror 230, the first support 630, the second support 640, and the third support 650.

The first support 630 may be mounted inside the second housing 620. The first support 630 may support the second support 640. The first support 630 may move the lens assembly 210 and the second support 640 in the first direction (X-axis direction). The first support 630 may implement the AF function.

The first support 630 may be disposed in the second direction (Y-axis direction) perpendicular to the first direction (X-axis direction) in which the lens assembly 210 makes light travel. The first support 630 may be inclined to the side in the second direction from the lens assembly 210. The first support 630 may be disposed to make contact with at least a portion of one side surface of the lens assembly 210.

The second support 640 may be mounted inside the second housing 620. The second support 640 may include a protrusion disposed adjacent to the first support 630 in the third direction (Z-axis direction) and a main body to surround the lens assembly 210. The second support 640 may support the lens assembly 210. The second support 640 may move the lens assembly 210 in the second direction (Y-axis direction). The second support 640 may implement an OIS function in the first direction (X-axis direction).

The second support 640 may be disposed in the second direction (Y-axis direction) perpendicular to the first direction (X-axis direction) in which the lens assembly 210 makes light travel. The second support 640 may be disposed in the same direction as that of the first support 630 based on the lens assembly 210. The second support 640 may be disposed to make contact with at least a portion of one side surface of the lens assembly 210.

The third support 650 may be mounted inside the second housing 620. The third support 650 may support the mirror 341. The third support 650 may adjust an angle at which external light travels in the third direction (Z-axis direction), as the mirror 341 rotates. The second support 640 may implement the OIS function in the second direction (Y-axis direction).

The third support 650 may be disposed in the second direction (Y-axis direction) perpendicular to the first direction (X-axis direction) in which the lens assembly 210 makes light travel from the mirror 341. The third support 650 may be disposed to one side of the mirror 341.

Figure 7:
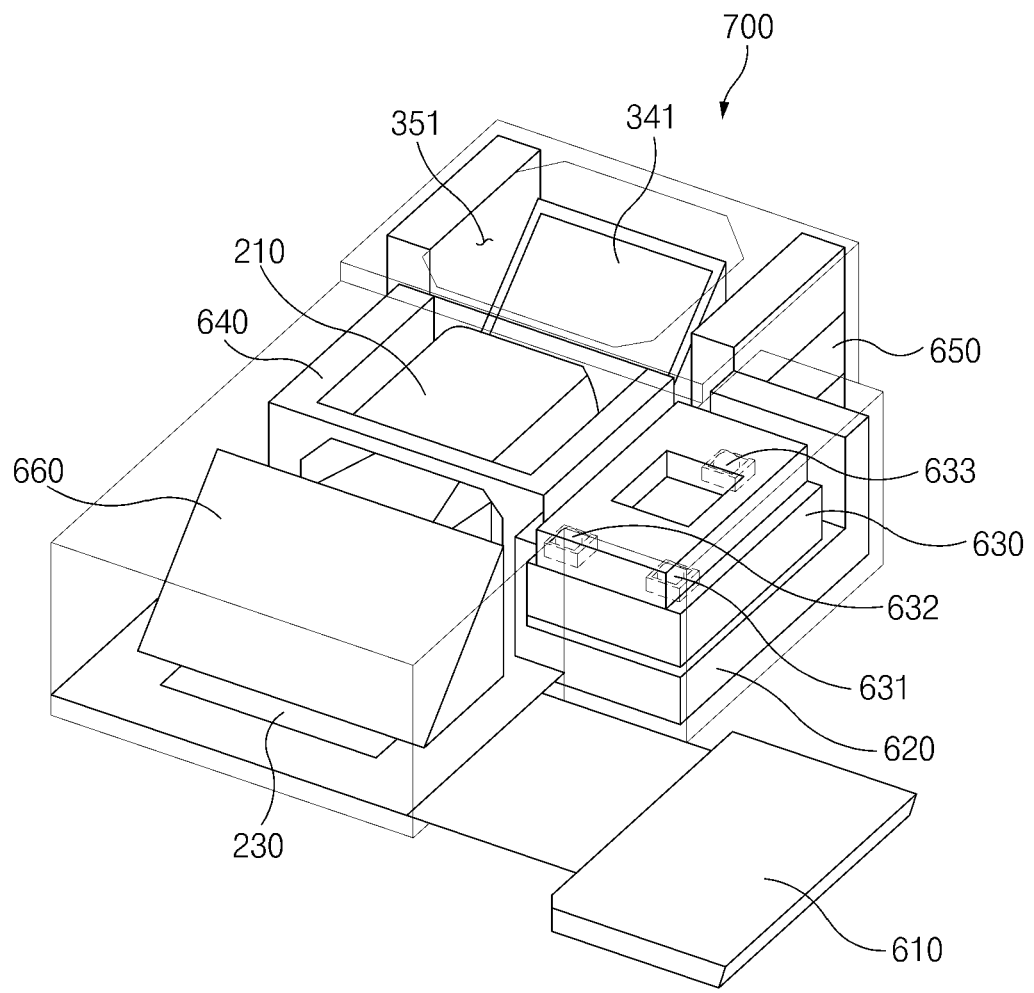
FIG. 7 illustrates a perspective view of a camera module, according to an embodiment.

FIG. 7 illustrates an exploded view 700 of a camera module 180, according to an embodiment.

Referring to FIG. 7, the camera module 180 includes a lens assembly 210, an image sensor 230, a mirror 341, a first housing 610, a second housing 620, a first support 630, a second support 640, a third support and/or a prism 660.

The first support 630 may include first rotation part 631, second rotation part 632, and third rotation part 633. The first rotation part 631, second rotation part 632, and third rotation part 633 may be disposed in a groove formed in the first support 630.

The first rotation part 631, second rotation part 632, and third rotation part 633 may move the protrusion of the second support 640 in the second direction (Y-axis direction). The first rotation part 631, second rotation part 632, and third rotation part 633 may allow the protrusion of the second support 640 to slide in the second direction. For example, the first rotation part 631, second rotation part 632, and third rotation part 633 may be balls or bearings.

The main body of the second support 640 may surround the lens assembly 210 in the second direction (Y-axis direction) perpendicular to the traveling direction of the light. The protrusion of the second support 640 may be disposed on a side of the lens assembly 210 in the second direction. The protrusion of the second support 640 may be disposed in the third direction (Z-axis direction), which is perpendicular to the second direction, from the first support 630.

Figure 8:
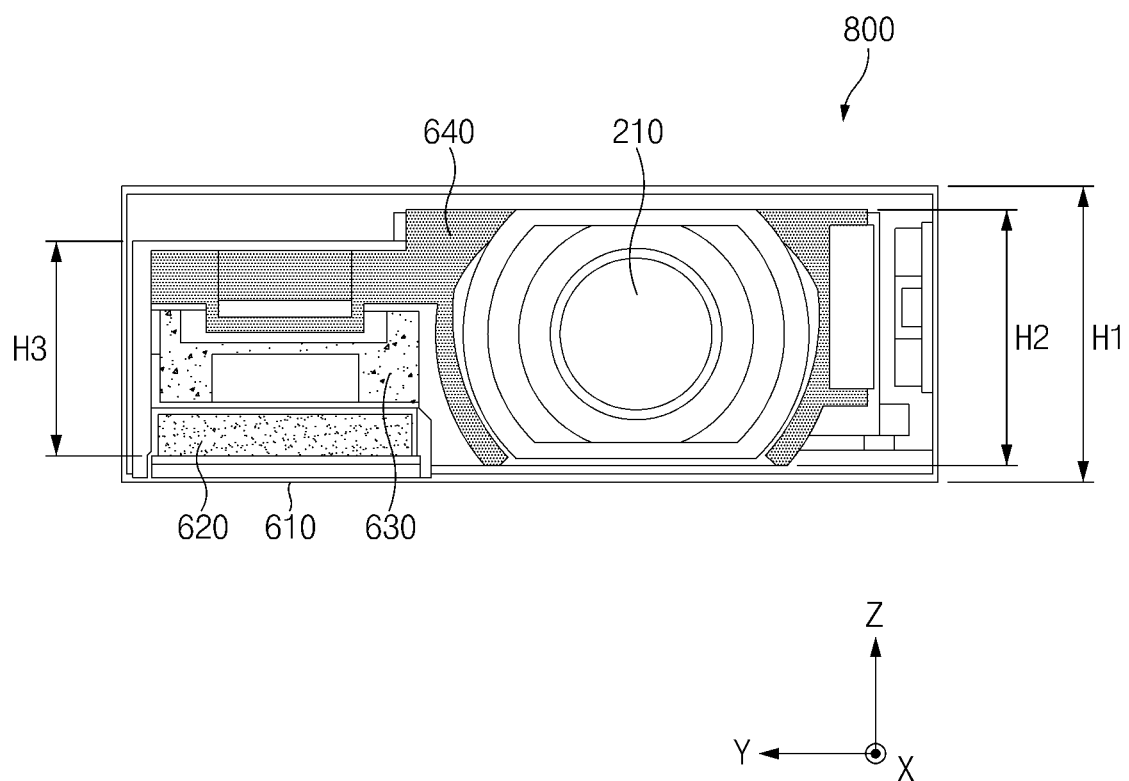
FIG. 8 illustrates a sectional view illustrating a camera module, according to an embodiment.

FIG. 8 illustrates a sectional view 800 of a camera module 180, according to an embodiment.

Referring to FIG. 8, the lens assembly 210 may have a first height H1 formed in the third direction (Z-axis direction). The performance, such as the focal length and/or the maximum magnification of the lens assembly 210, of the optical system may vary depending on the first height H1. The first height H1 may be equal to or greater than a specific length, such that the lens assembly 210 satisfies a specific condition.

The first housing 610, the second housing 620, the first support 630, and the second support 640 may be disposed in the second direction (Y-axis direction) from the lens assembly 210. The first support 630 may be interposed between the second housing 620 and the second support 640. The second support 640 may include a main body to surround the lens assembly 210 and a protrusion protruding in the second direction and making contact with the first support 630 in the third direction (Z-axis direction).

The main body of the lens assembly 640 may have the second height H2 when viewed in the third direction (Z-axis direction). A portion corresponding to the second height H2 may be overlapped with a portion corresponding to the first height H1, when viewed in the third direction (the Z-axis direction). The second height H2 may be less than the first height H1.

The protrusions of the second housing 620, the first support 630, and the second support 640 may have the third height H3 when viewed in the third direction (Z-axis direction). A portion corresponding to the third height H3 may be overlapped with the portion corresponding to the first height H1 when viewed in the third direction. The third height H3 may be less than the first height H1.

The height, which is formed in the third direction (Z-axis direction), of the camera module 180 may be substantially equal to the first height H1, which is formed in the third direction, of the lens assembly 210. The first support 630 and the second support 640 may be disposed eccentrically in the second direction (Y-axis direction) from the lens assembly 210. Accordingly, the height, which is formed in the third direction, of the camera module 180 may be constantly maintained regardless of the height of the second housing 620, the first support 630, and the second support 640.

Figure 9:
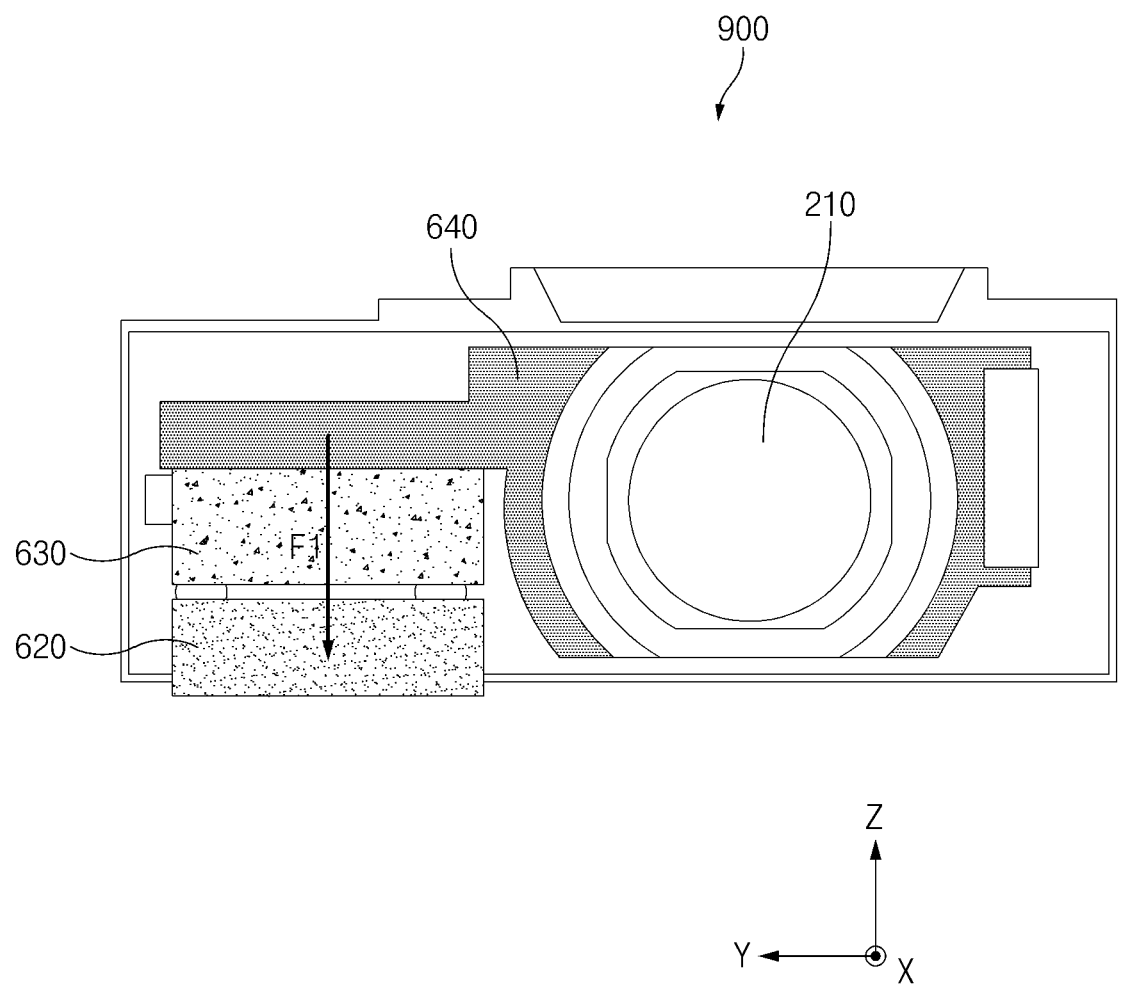
FIG. 9 illustrates a sectional view illustrating a camera module, according to an embodiment.

FIG. 9 illustrates a sectional view 900 of a camera module 180, according to an embodiment.

Referring to FIG. 9, the protrusions of the second housing 620, the first support 630, and the second support 640 are disposed eccentrically in the second direction (Y-axis direction) from the lens assembly 210. The protrusions of the second housing 620, the first support 630, and/or the second support 640 may have specific gravity greater than that of the lens assembly 210. The protrusions of the second housing 620, the first support 630, and/or the second support 640 may be greater than a part in which the lens assembly 210 is disposed, in terms of normal force applied in the third direction (Z-axis direction).

The protrusion of the second housing 620, the first support 630, and the second support 640 may have first rotational force F1 formed in the third direction (Z-axis direction). The first rotational force F1 may be proportional to the weight of the second housing 620, the first support 630, and/or the second support 640. When the camera module 180 rotates with the first rotational force F1, the lens assembly 210 may be broken. Alternatively, when the camera module 180 receives the first rotational force F1, the protrusions of the second housing 620, the first support 630 and/or the second support 640 may be separated from the lens assembly 210. Alternatively, when the camera module 180 receives the first rotational force F1, the second housing 620, the first support 630 and/or the second support 640 may be separated from each other.

The second housing 620, the first support 630 and/or the second support 640 may employ a structure of enduring the first rotational force F1 to prevent the second housing 620, the first support 630 and/or the second support 640 from being separated from each other. Alternatively, the second housing 620, the first support 630 and/or the second support 640 may be formed to make close contact with each other to endure the rotational force F1.

Figure 10:
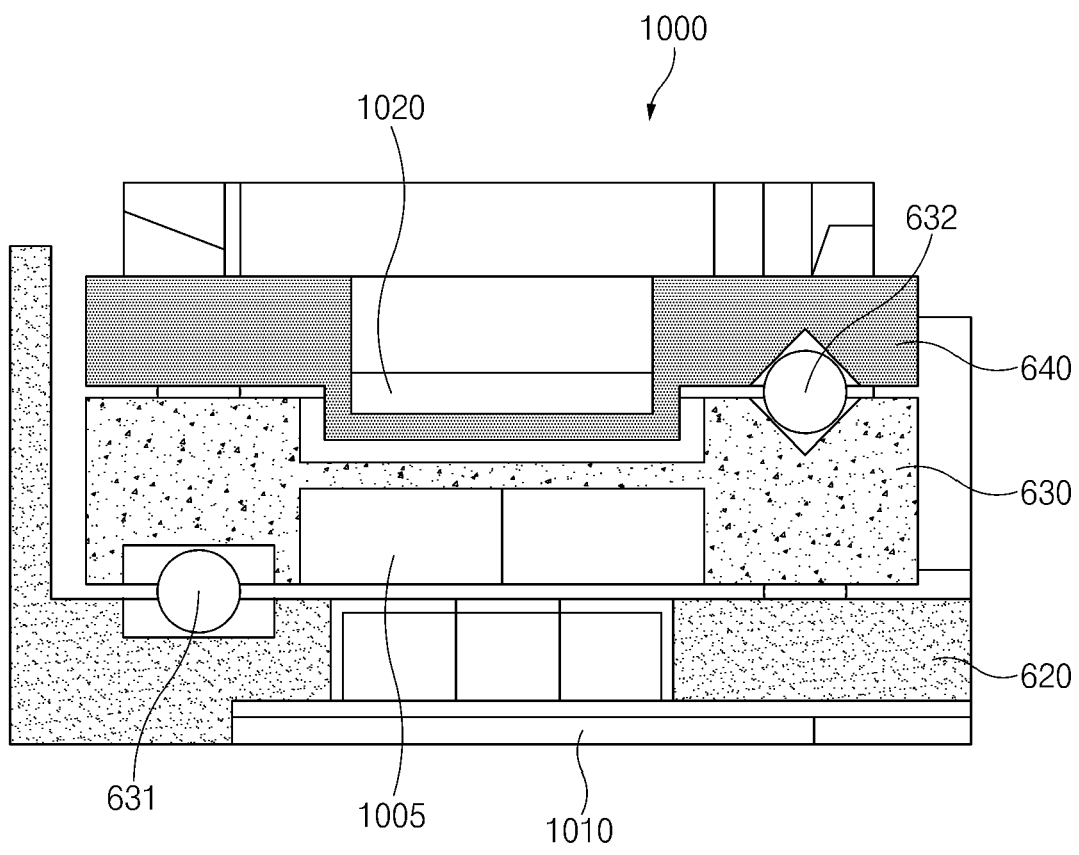
FIG. 10 illustrates a sectional view illustrating a second housing, a first support, and a second support, according to an embodiment.

FIG. 10 illustrates a sectional view 1000 illustrating the second housing 620, the first support 630, and the second support 640, according to an embodiment.

Referring to FIG. 10, the first support 630 includes the first rotational part 631 and the second rotational part 632. The first rotational part 631 and the second rotational part 632 may be configured to slide in the first direction (the X-axis direction) and/or the second direction (the Y-axis direction) in the state that the first support 630 makes contact with the second housing 620 and/or the second support 640 in the third direction (the Z-axis direction).

The first support 630 may include a magnet member 1005. The magnet member 1005 may be disposed inside or on one surface of the first support 630. The magnet member 1005 may be disposed at the center of the first support 630.

The second housing 620 may include a first metal member 1010 overlapped with the magnet member 1005 in the third direction (Z-axis direction). The first metal member 1010 may receive a force to attach the magnet member 1005 to the first metal member 1010.

The second housing 640 may include a second metal member 1020 overlapped with the magnet member 1005 in the third direction (Z-axis direction). The second metal member 1020 may be disposed opposite to the first metal member 1010 in the third direction based on the magnet member 1005. The second metal member 1020 may receive a force to attach the magnet member 1005 to the second metal member 1020.

The magnet member 1005 may apply a force to attract the first metal member 1010 and the second metal member 1020 to be closer to each other in the third direction (Z-axis direction). The second housing 620, the first support 630, and/or the second support 640 may receive a force allowing the second housing 620, the first support 630, and/or the second support 640 to make close contact with each other. Accordingly, even if a rotational force F1 is formed due to the normal force applied to the second housing 620, the first support 630, and/or the second support 640 in the third direction, the second housing 620, the first support 630, and/or the second support 640 may not be separated from each other.

Figure 11:
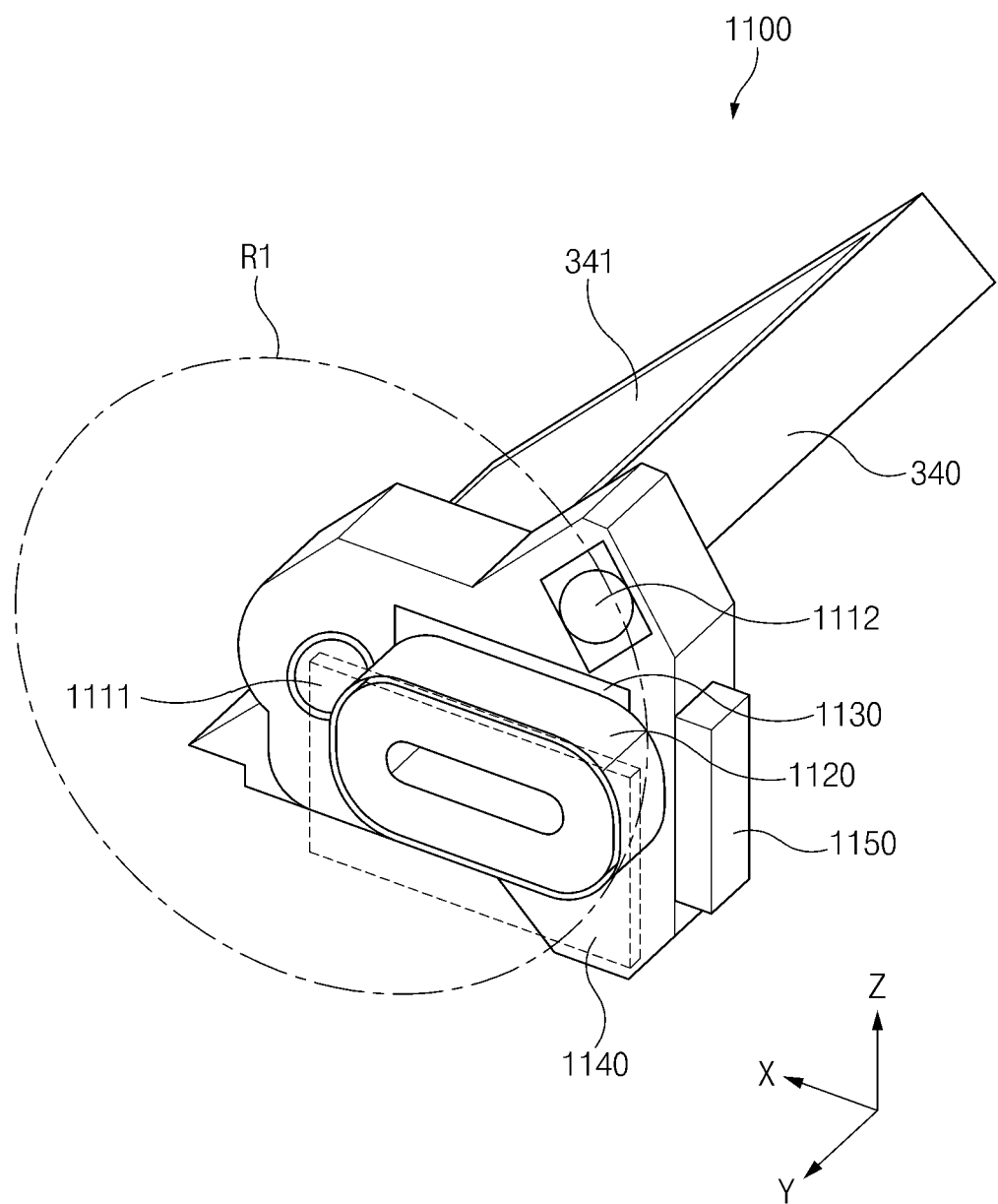
FIG. 11 illustrates a rotation driver driving a third support and a mirror, according to an embodiment.

FIG. 11 illustrates a rotation driver 1100 driving the third support 340 and the mirror 341, according to an embodiment.

Referring to FIG. 11, the rotation driver 1100 includes a first shaft 1111, a second shaft 1112, a metal member 1120, a magnet member 1130, a support member 1140, and/or a sensor 1150.

The first shaft 1111 may be disposed adjacent to the second support 340 and the mirror 341 in the second direction (Y-axis direction). The first shaft 1111 may be connected to the center of one side edge of the third support 340 in the second direction. The first shaft 1111 may be a central shaft for rotating the third support 340 and the mirror 341. The first shaft 1111 may rotate the third support 340 and the mirror 341 along the first radius R1. The first shaft 1111 may be implemented in the form of a bearing or a cylindrical rotating body.

The second shaft 1112 may be disposed on the support member 1140. The second shaft 1112 may be connected to a vertex of one side of the third support 340 in the second direction (Y-axis direction). The second shaft 1112 may hold the third support 340 when the third support 340 and the mirror 341 rotate.

The second shaft 1112 may be spaced apart from the first shaft 1111 by the first radius R1. As the distance between the first shaft 1111 and the second shaft 1112 increases, the rotation driving distance may increase based on the second shaft 1112 rotating by an angle equal to an angle formed by the increased distance between the first shaft 1111 and the second shaft 1112.

The metal member 1120 may protrude from the support member 1140 in the second direction (Y-axis direction) and may receive a force to attach the magnet member 1130 to the support member 1140. The metal member 1120 may be connected to a support (e.g., the third support 650) connected to the housing (e.g., the second housing 620).

The magnet member 1130 may be inserted into the support 1140. The magnet member 1130 may receive a force to attach the metal member 1120 to the magnet member 1130.

The sensor 1150 may be attached to one side of the support 1140 in the first direction (X-axis direction). The sensor 1150 may measure the moving angle of the third support 340 and the mirror 341. For example, the sensor 1150 may be a Hall sensor.

The sensor 1150 may be spaced apart from the first shaft 1111 by a distance longer than the first radius R1. When the distance between the sensor 1150 and the first shaft 1111 is longer than the radius R1 formed as the third support 340 and the mirror 341, rotatable about the first shaft 1111, the sensor 1150 may measure the moving angle of the third support 340 and the mirror 341.

An electronic device 101 may include a lens assembly 210 to allow external light, which is used by a camera module 180 to capture a still image and a moving picture, to travel in a first direction (e.g., the X-axis direction), a housing (e.g., the first housing 610 and the second housing 620) forming an outer portion of the camera module, a first support 630 disposed inside the housing while extending in a second direction (e.g., the Y-axis direction), which is perpendicular to the first direction, away from the lens assembly, and a second support 640 having at least a portion protruding in the second direction while surrounding the lens assembly. The first support and the second support may be disposed eccentrically in the second direction away from the lens assembly.

The first support 630 may move the lens assembly 210 and the second support 640 in the first direction (X-axis direction).

The first support 630 may implement an AF function to adjust a focal length of the lens assembly 210.

The second support 640 may include a protrusion disposed adjacent to the first support 630 in the third direction (e.g., the Z-axis direction) perpendicular to the first direction (the X-axis direction) and the second direction (the Y-axis direction), and a main body to surround the lens assembly 210.

The second support 640 may implement an OIS to reduce an influence exerted in the first direction due to hand shaking of a user.

The electronic device may further include a mirror 341 to allow the external light to be incident onto the lens assembly 210 in the first direction (the X-axis direction), and a third support 650 to support the mirror 341. The third support 650 may adjust at an angle, at which the external light travels, in a third direction (the Z-axis direction) perpendicular to the first direction and the second direction (the Y-axis direction) as the mirror 341 is rotated.

The third support 650 is disposed to one side of the mirror 341 in the second direction (the Y-axis direction) from the mirror 341.

The first support 630 includes at least one rotation part (e.g., the first rotation part 631, the second rotation part 632 and the third rotation part 633) disposed in a groove formed in the first support 630, and the at least one rotation part may move the second support in the second direction.

An electronic device 101 may include a lens assembly 210 to allow external light, which is used by a camera module 180 to capture a still image and a moving picture, to travel in a first direction (the X-axis direction), a housing (e.g., the first housing 610 and the second housing 620) forming an outer portion of the camera module 180, a first support 630 disposed inside the first housing 610 and the second housing 620 while extending in a second direction (the Y-axis direction), which is perpendicular to the first direction, away from the lens assembly 210, and a second support 640 having at least a portion protruding in the second direction while surrounding the lens assembly 210. The first support 630 includes a magnet member 1005. The first housing 610 or the second housing 620 may include a first metal member 1010, and the second support 640 may include a second metal member 1020.

The magnet member 1005 is disposed inside the first support 630 or on one surface of the first support 630. The first metal member 1010 and the second metal member 1020 are disposed to be overlapped with the magnet member 1005 in a third direction (the Z-axis direction) perpendicular to the first direction (the X-axis direction and the second direction (the Y-axis direction).

The magnet member 1005 applies a force to attract the first metal member 1010 and the second metal member 1020 such that the first metal member 1010 and the second metal member 1020 are closer to each other in a third direction (the Z-axis direction) perpendicular to the first direction (the X-axis direction) and the second direction (the Y-axis direction).

The first support 630 and the second support 640 are disposed in the second direction (the Y-axis direction) away from the lens assembly 210, and a height of the camera module 180 in a third direction (the Z-axis direction), which is perpendicular to the first direction (the X-axis direction) and the second direction, may be substantially equal to a height of the lens assembly in the third direction.

An electronic device 101 may include a lens assembly 210 to allow external light, which is used by a camera module 180 to capture a still image and a moving picture, to travel in a first direction (the X-axis direction), a first housing 610 or a second housing 620 forming an outer portion of the camera module 180, a first support 630 disposed inside the first housing 610 or the second housing 620 while extending in a second direction (the Y-axis direction), which is perpendicular to the first direction, away from the lens assembly 210, a second support 640 having at least a portion protruding in the second direction while surrounding the lens assembly 210, a third support 650 to support a mirror 341 allowing the light to be incident onto the lens assembly 210 in the first direction, and a rotation driver 1100 to drive the third support 650 such that the third support 650 rotates along a first radius R1. The rotation driver 1100 may include a sensor 1150 to measure an angle of the third support 650. The sensor 1150 may be spaced apart from a rotation shaft (e.g., the first shaft 1111) of the rotation driver 1100 by a length longer than the first radius R1.

The rotation driver 1100 may include a support member 1140 to support the sensor 1150, and a metal member 1120 protruding in the second direction (the Y-axis direction) away from the support member 1140. The metal member 1120 may be connected with the third support 650, which may be connected with the first housing 610 or the second housing 620.

The rotation shaft 1111 is connected to the center of an edge of one side of the third support 650 in the second direction (the Y-axis) to rotate the third support 650 and the mirror 341.

An electronic device 101 may include an external housing including a first external surface facing in a first direction (e.g., +Z-axis direction) and a second external surface facing in a second direction (e.g., −Z-axis direction) opposite to the first direction, a camera housing (e.g., the first housing 610 and the second housing 620) provided inside the external housing, disposed adjacent to the first external surface, and including a first surface facing in the first direction and including an opening 351, a second surface facing in the second direction, a third surface facing in a third direction (e.g., −Y-axis direction) perpendicular to the first direction, a fourth surface facing in a fourth direction (e.g., +Y-axis direction) opposite to the third direction, and a fifth surface facing in a fifth direction (e.g., +X-axis direction) perpendicular to the first direction, the third direction, and the fourth direction, wherein the fifth surface makes contact with the third surface. The electronic device further includes an image sensor 230 disposed inside the camera housing, a lens unit (e.g., the lens assembly 210) including a plurality of lenses disposed inside the camera housing, aligned about a shaft extending in the fifth direction, and including faces substantially facing in the fifth direction, a first structure (e.g., the second support 640) disposed inside the camera housing, surrounding at least a portion of the lens unit 210, and including a protrusion extending in the fourth direction, and a second structure (e.g., the first support 630) interposed between the protrusion and the second surface, inside the camera housing and including a sixth surface facing in the first direction and a seventh surface facing in the second direction. A first distance from the shaft to the fourth surface may be longer than a second distance from the shaft to the third surface.

The protrusion includes an OIS driver 640.

The second structure includes an AF driver 630.

The electronic device may further include a magnet member 1005 disposed inside the second structure 630 or on the seventh surface, a first metal member 1010 including at least a portion overlapped with the magnet member 1005 inside the protrusion, when viewed from a top of the first surface, and a second metal member 1020 including at least a portion overlapped with the magnet member 1005 inside the second surface of the housing, when viewed from the top of the first surface.

The electronic device may further include a mirror 341 disposed in the camera housing to reflect light, which is introduced through the opening 351 of the first surface, toward the lens unit 210.

The electronic device may include a driver (e.g., the third support 650) to move the first structure 640 and the second structure 630 along the shaft together with the lens unit 210.

The electronic device may further include a touchscreen display (e.g., the display 160) viewed through the second surface.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment of the disclosure, the performance of the folded camera may be maintained by maintaining the size of the optical system by preventing the AF driver and/or the OIS driver from protruding in the thickness direction of the electronic device.

While the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device, comprising:
    a lens assembly that receives external light, which is used by a camera module to capture at least one of a still image and a moving picture, in a first direction;
    a housing forming an outer portion of the camera module;
    a first support disposed inside the housing and in a second direction away from the lens assembly, wherein the second direction is perpendicular to the first direction;
    a second support including at least a portion protruding in the second direction while surrounding the lens assembly;
    a first driver of the first support disposed on a first edge of the housing and configured to move the lens assembly in the first direction;
    a first driver of the second support disposed on the first edge of the housing; and
    a second driver of the second support disposed on a second edge of the housing opposite to the first edge of the housing,
    wherein the first driver of the second support and the second driver of the second support are configured to move the second support in the second direction, and
    wherein the first support and the second support are disposed in the second direction away from the lens assembly.

2. The electronic device of claim 1, wherein the first support moves the lens assembly and the second support in the first direction.

3. The electronic device of claim 1, wherein the first support implements an auto focus (AF) function to adjust a focal length of the lens assembly.

4. The electronic device of claim 1, wherein the second support includes:
    a protrusion disposed adjacent to the first support in a third direction perpendicular to the first direction and the second direction; and
    a main body to surround the lens assembly.

5. The electronic device of claim 1, wherein the second support implements an optical image stabilizer (OIS) for reducing an influence exerted in the first direction due to shaking of the electronic device.

6. The electronic device of claim 1, further comprising:
    a mirror that reflects the external light to be incident onto the lens assembly in the first direction; and
    a third support to support the mirror,
    wherein the third support adjusts at an angle, at which the external light travels, in a third direction perpendicular to the first direction and the second direction as the mirror is rotated.

7. The electronic device of claim 6, wherein the third support is disposed to one side of the mirror, and
    wherein the third support is disposed in the second direction from the mirror.

8. The electronic device of claim 1, wherein the first support includes at least one rotation part disposed in a groove formed in the first support; and
    wherein the at least one rotation part moves the second support in the second direction.

9. An electronic device, comprising:
    a lens assembly that receives external light, which is used by a camera module to capture at least one of a still image and a moving picture, in a first direction;
    a housing forming an outer portion of the camera module;
    a first support disposed inside the housing while extending in a second direction, which is perpendicular to the first direction, away from the lens assembly;
    a second support having at least a portion protruding in the second direction while surrounding the lens assembly;
    a first driver of the first support disposed on a first edge of the housing and configured to move the lens assembly in the first direction;
    a first driver of the second support disposed on the first edge of the housing; and
    a second driver of the second support disposed on a second edge of the housing opposite to the first edge of the housing,
    wherein the first driver of the second support and the second driver of the second support are configured to move the second support in the second direction,
    wherein the first support includes a magnet member,
    wherein the housing includes a first metal member, and
    wherein the second support includes a second metal member.

10. The electronic device of claim 9, wherein the magnet member is disposed inside the first support or on one surface of the first support, and
    wherein the first metal member and the second metal member are disposed to be overlapped with the magnet member in a third direction perpendicular to the first direction and the second direction.

11. The electronic device of claim 9, wherein the magnet member applies a force to attract the first metal member and the second metal member such that the first metal member and the second metal member are closer to each other in a third direction perpendicular to the first direction and the second direction.

12. The electronic device of claim 9, wherein the first support and the second support are disposed in the second direction away from the lens assembly, and wherein a height of the camera module in a third direction, which is perpendicular to the first direction and the second direction, is substantially equal to a height of the lens assembly in the third direction.

13. An electronic device, comprising:
a lens assembly that receives external light, which is used by a camera module to capture at least one of a still image and a moving picture, in a first direction;
a housing forming an outer portion of the camera module;
a first support disposed inside the housing while extending in a second direction, which is perpendicular to the first direction, away from the lens assembly;
a second support having at least a portion protruding in the second direction while surrounding the lens assembly;
a third support to support a mirror allowing the light to be incident onto the lens assembly in the first direction;
a rotation driver to drive the third support such that the third support rotates along a first radius;
a first driver of the first support disposed on a first edge of the housing and configured to move the lens assembly in the first direction;
a first driver of the second support disposed on the first edge of the housing; and
a second driver of the second support disposed on a second edge of the housing opposite to the first edge of the housing,
wherein the first driver of the second support and the second driver of the second support are configured to move the second support in the second direction,
wherein the rotation driver includes a sensor to measure an angle of the third support, and
wherein the sensor is spaced apart from a rotation shaft of the rotation driver by a length longer than the first radius.

14. The electronic device of claim 13, wherein the rotation driver includes:
a support member to support the sensor; and
a metal member protruding in the second direction from the support member,
wherein the metal member is connected with the third support, and
wherein the third support is connected with the housing.

15. The electronic device of claim 13, wherein the rotation shaft is connected to the center of an edge of the third support in the second direction to rotate the third support and the mirror.

16. An electronic device, comprising:
an external housing including a first external surface facing in a first direction and a second external surface facing in a second direction opposite to the first direction;
a camera housing provided inside the external housing, disposed adjacent to the first external surface, and including:
a first surface facing in the first direction and including an opening;
a second surface facing in the second direction;
a third surface facing in a third direction perpendicular to the first direction;
a fourth surface facing in a fourth direction opposite to the third direction; and
a fifth surface facing in a fifth direction perpendicular to the first direction, the third direction, and the fourth direction, wherein the fifth surface makes contact with the third surface;
an image sensor disposed inside the camera housing;
a lens unit including a plurality of lenses disposed inside the camera housing, aligned about a shaft extending in the fifth direction, and including faces substantially facing in the fifth direction;
a first structure disposed inside the camera housing, surrounding at least a portion of the lens unit, and including a protrusion extending in the fourth direction; and
a second structure interposed between the protrusion and the second surface, inside the camera housing and including a sixth surface facing in the first direction and a seventh surface facing in the second direction,
wherein the protrusion includes an optical image stabilizer (OIS) driver,
wherein the second structure includes an auto focus (AF) driver,
wherein a first distance from the shaft of the lens unit to the fourth surface is longer than a second distance from the shaft of the lens unit to the third surface in order to avoid protruding in a thickness direction of the electronic device.

17. The electronic device of claim 16, further comprising:
a magnet member disposed inside the second structure or on the seventh surface;
a first metal member including at least a portion overlapped with the magnet member inside the protrusion, when viewed from a top of the first surface; and
a second metal member including at least a portion overlapped with the magnet member inside the second surface of the housing, when viewed from the top of the first surface.

18. The electronic device of claim 16, further comprising a mirror disposed in the camera housing that reflects light, which is introduced through the opening of the first surface, toward the lens unit.

19. The electronic device of claim 16, further comprising a driver that moves the first structure and the second structure along the shaft together with the lens unit.

20. The electronic device of claim 16, further comprising a touchscreen display viewed through the second surface.

* * * * *